Patented Nov. 27, 1951

2,576,899

UNITED STATES PATENT OFFICE 2,576,899

PARTIAL ESTERS OF POLYBASIC SULFIDE CARBOXYLIC ACIDS AND PROCESS FOR MAKING SAME

Otto Albrecht, Munchenstein, Switzerland, assignor to Ciba Limited, Basel, Switzerland No Drawing. Application March 25, 1949, Serial No. 84,478. In Switzerland April 16, 1948

14 Claims. (Cl. 260—481)

According to this invention new partial esters of polybasic sulfide carboxylic acids are made by reacting a mercapto-carboxylic acid or a salt thereof with an ester of an unsaturated carboxylic acid containing in at least one ester group the radical of an alcohol having at least 6 carbon atoms, the reaction being conducted, if desired, in the presence of an accelerator. The reaction leads to an additive combination of the mercapto-carboxylic acid with the unsaturated bond of the unsaturated ester.

As mercapto-carboxylic acids there may be used, for example, lower aliphatic mercapto-carboxylic acids, such as thioglycolic acid, thiolactic or $\beta$-mercapto-butyric acid. Especially suitable for the purposes of the present application is thioglycolic acid.

The esters used as starting materials are derived, on the one hand, from unsaturated aliphatic mono- or dibasic carboxylic acids, such as acrylic acid, methacrylic acid, maleic acid, fumaric acid, citraconic acid, or itaconic acid or mesaconic acid and, on the other hand, from hydroxy compounds containing at least 6 carbon atoms. Among these hydroxy compounds there may be mentioned: Higher aliphatic alcohols, such as hexyl alcohols, for example, 2-ethyl-butanol and also octyl alcohols, for example, 2 ethyl-hexanol, and furthermore lauryl alcohol, myristic alcohol, cetyl alcohol, octadecyl alcohol or oleyl alcohol; hydroxy-alkyl ethers of these aliphatic alcohols, for example, mono-ethers of the said alcohols with ethylene glycol or polyglycols; hydroxyalkyl esters or N-hydroxyalkyl-amides of higher fatty acids, such as lauric acid, for example, stearic acid $\beta$-hydroxyethyl ester, stearic acid diglyceride, stearic acid N-($\beta$-hydroxyethyl)-amide or oleic acid N-($\beta$-hydroxyethyl)-amide; esters or amides of hydroxycarboxylic acids, such as glycolic acid octadecyl ester, ricinoleic acid methyl ester, ricinoleic octadecyl ester or 11-hydroxystearic cetyl ester; aromatic hydroxy compounds, such as phenols and naphthols, especially alkylated; aromatic alcohols, such as benzyl alcohol, cycloaliphatic alcohols, such as methylcyclohexanol, decalols, and also terpene alcohols; and furthermore alcohols corresponding to resin acids, such as dihydro- or tetrahydro-abietyl alcohol or mixtures thereof.

Suitable starting materials for the process of the present invention are, however, principally diesters derived from aliphatic $\alpha$:$\beta$-unsaturated-dicarboxylic acids, such as maleic acid, fumaric acid, citraconic acid, itaconic acid, or mesaconic acid, on the one hand, and aliphatic hydroxy compounds containing 6–30 carbon atoms on the other hand.

Especially valuable products are obtainable from diesters derived from maleic acid, on the one hand, and either aliphatic alcohols containing from 6 to 18 carbon atoms, such as hexyl alcohol, 2-ethyl-butanol, 2-ethyl-hexanol, lauryl alcohol, cetyl alcohol, octadecyl alcohol or fatty acid-N-hydroxyalkylamides containing 14–30 carbon atoms, on the other hand.

Among the fatty acid-N-hydroxyalkylamides containing 14 to 30 carbon atoms, there may be mentioned the N-hydroxy-alkylamides of lauric acid, myristic acid, palmitic acid, stearic acid, oleic acid, behenic acid or montanic acid.

The reaction may be carried out, for example, by mixing the reactants at room temperature, in substantially molecular proportions, but advantageously with the application of heat, for example, at 50–100° C. It may be of advantage to add a small proportion of a substance capable of accelerating the reaction, especially a substance of alkaline reaction such as an alkali hydroxide, an alkali alcoholate or an organic base, for example, piperidine, and to conduct the reaction with the exclusion of oxygen. When there is used, instead of the mercapto-carboxylic acid, a salt thereof, it is of advantage to work in the presence of a suitable solvent, for example with the addition of an alcohol or a mixture thereof with water.

The products of the invention are soluble in water in the form of their alkali salts, such as alkalimetal or ammonium salts, and the water soluble salts may be used as textile assistants. The products of the invention which contain, for example, two ester groups having alcohol radicals of 6–10 carbon atoms, especially ester groups containing the radicals of branched chain alcohols, possess a good wetting action, while those products which contain longer aliphatic chains, especially those having 16–18 carbon atoms, are suitable as softening agents for textile fibers. An especially good softening action is obtained with those products which contain two ester groups having long chain alcohol radicals having 14 to 30 carbon atoms. Furthermore, the products of the invention can be used also as foaming agents, washing agents or emulsifying agents.

The products of the invention may be designated as partial esters of the formula

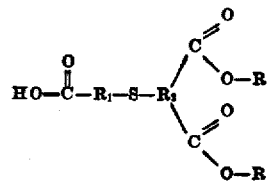

wherein R is the radical of an aliphatic hydroxy compound of the formula HO—R containing 6-30 carbon atoms and $R_1$ and $R_2$ are lower alkylene, or their water soluble salts. Examples of these products are the compounds of the following formulae

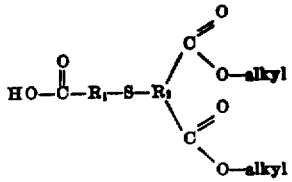

wherein $R_1$ and $R_2$ are lower alkylene and alkyl is an aliphatic hydrocarbon radical containing 6-18 carbon atoms, or

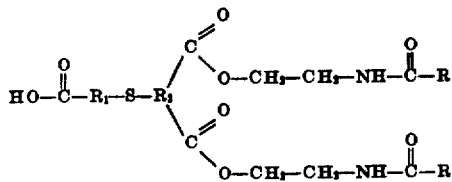

wherein

is the acyl radical of a fatty acid containing 12-18 carbon atoms, $R_1$ and $R_2$ are lower alkylene, or

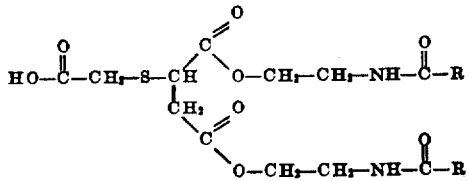

wherein

is the acyl radical of a fatty acid containing 12-18 carbon atoms.

The products obtainable by the invention may be used alone or together with other substances customarily used in conjunction with textile assistants, for example, together with salts or dispersing agents which are resistant to lime, for example, salts of sulfonated benzimidazoles substituted at the μ-carbon atom by a higher alkyl group, or monocarboxylic acid esters of 4-sulfophthalic acid with higher fatty alcohols, or fatty alcohol sulfonates or condensation products of higher fatty acids with aliphatic hydroxy- or amino-sulfonic acids.

The following examples illustrate the invention, the parts being by weight unless otherwise stated and the relationship of parts by weight to parts by volume being the same as that of the kilogram to the liter:

Example 1

2.2 parts of thioglycolic acid and 14.6 parts of the diester of maleic acid with oleic acid N-(β-hydroxyethyl)-amide are heated at 70-75° C. with the exclusion of oxygen until a test sample neutralized with sodium hydroxide gives a practically clear solution in water. The reaction product is then dissolved in alcohol, neutralized with sodium hydroxide solution and evaporated to dryness. The residue obtainable in this manner is the sodium salt of the acid of the formula

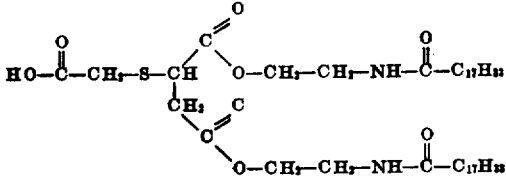

It is a soft mass which is taken up by hot water to form a practically clear foaming solution.

The maleic acid ester used as starting material may be prepared as follows:

9.8 parts of maleic anhydride and 65 parts of oleic acid N-(β-hydroxyethyl)-amide are heated for three hours in a boiling water bath while stirring. 50 parts of benzene and 0.4 part by volume of concentrated sulfuric acid are then added, and the whole is heated to boil the benzene until the water is no longer split off. The distillate flowing from the reflux condenser is allowed to return to the reaction vessel after flowing through a water trap of known construction. In this manner the water split off during the esterification is removed from the reaction mixture. After the esterification the reaction product is neutralized and the benzene is removed by distillation.

The new sodium salt obtained as described above may be used as a textile assistant, for example, as a very active softening agent for cellulose fibers. For this purpose there may be used, for example, a mixture of 70 parts of the above sodium salt and 30 parts of the disodium salt of N-benzyl-μ-heptadecyl-benzimidazole disulfonic acid.

Example 2

2.2 parts of thioglycolic acid and 14.1 parts of the diester of maleic acid with stearic acid-N-(β-hydroxyethyl)-amide are heated at 70-75° C. with the exclusion of oxygen until a test portion neutralized with sodium hydroxide gives a practically clear solution in water. The reaction product is then dissolved in alcohol, neutralized with sodium hydroxide solution and evaporated to dryness. The residue obtainable in this manner is the sodium salt of the acid of the formula

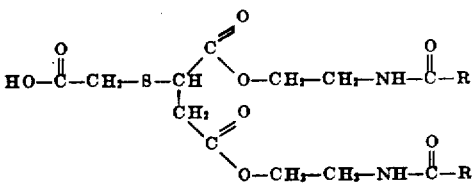

in which

represents the acyl radical of commercial stearic acid. It is a solid pulverizable mass which when taken up in hot water yields a practically clear foaming solution.

The diester used as starting material may be obtained in a manner similar to that described in Example 1.

The new sodium salt can be used as a softening agent for cellulose fibers or for wool. For this purpose there is advantageously used a mixture of the product with a dispersing agent resistant to lime. A suitable mixture consists of 70 parts of the above described sodium salt and 30 parts of the disodium salt of N-benzyl-μ-heptadecyl benzimidazole disulfonic acid.

Example 3

4.6 parts of thioglycolic acid and 8.5 parts of maleic acid di-(2-ethyl-hexyl)-ester are heated with the exclusion of oxygen first for three hours at 45–50° C. and then at 70–75° C. until a test portion neutralized with sodium hydroxide gives a practically clear solution in water.

The esterification mixture dissolved in alcohol is neutralized with sodium hydroxide solution and evaporated to dryness. The new ester is the sodium salt of the acid of the formula

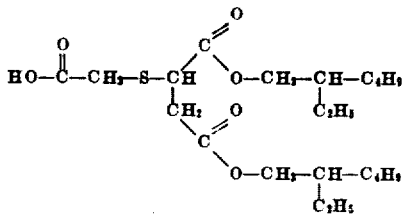

and is a soft mass which when taken up in water yields a foaming solution having a high wetting capacity. The new product can be used as a wetting agent.

Example 4

15.4 parts of maleic acid di-(2-ethyl-butyl)-ester and 5 parts of thioglycolic acid are heated with the exclusion of oxygen first for three hours at 45–50° C. and then for about 24 hours at 70–75° C. The esterification mixture, after being taken up in alcohol, is neutralized with sodium hydroxide solution and evaporated to dryness. The new sodium salt of the acid of the formula

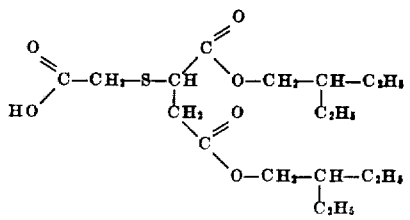

and is a soft mass which when taken up in water yields a foaming solution having a high wetting capacity. The new product can be used as a wetting agent.

For the purpose of further purification the sodium salt described above may be dissolved in methanol, and, after the addition of ether, caused to separate into two layers by means of water, and the aqueous layer is evaporated to dryness.

Example 5

Yarn of viscose artificial silk may be softened in the following manner:

0.03 part of the mixture described in the last paragraph of Example 2 is dissolved in 300 parts of water of 20° German hardness, and 10 parts of the yarn are treated with the resulting solution at 30° C. for 30 minutes. After centrifuging and drying the treated yarn, it has a very soft slippery feel.

Example 6

There is prepared a liquor containing, per liter, 160 grams of dimethylol urea, 6 cc. of concentrated ammonia solution of about 22 per cent. strength, 10 grams of ammonium chloride and one gram of the mixture described in the last paragraph of Example 2. Viscose crepe is immersed in the liquor at room temperature, and then squeezed, dried at 70° C. and then heated at 140° C. for 5 minutes. The material which has been given a crease-resistant finish in this manner also possesses a soft slippery feel.

Example 7

Chlorinated wool is softened in the following manner:

0.2 part of the mixture described in the last paragraph of Example 1 is dissolved in 300 parts of water, and 10 parts of chlorinated wool are treated in the solution at 30° C. for half an hour. After being centrifuged and dried, the wool so treated has a distinctly softer feel than the wool not so treated.

What I claim is:

1. A process for the manufacture of a new partial ester of a polybasic sulfide carboxylic acid, which comprises heating substantially molecular proportions of a lower aliphatic mercapto-carboxylic acid which contains 2 to 4 carbon atoms and of a diester of maleic acid with a member selected from the group consisting of a hydroxyalkylamide of a fatty acid containing 12 to 18 carbon atoms and an aliphatic alcohol containing 6–18 carbon atoms, while excluding oxygen, to a temperature of 50–100° C. until the reacton product, after neutralization with an alkali hydroxide, is soluble in water.

2. A process for the manufacture of a new partial ester of a polybasic sulfide carboxylic acid, which comprises heating substantially molecular proportions of a lower aliphatic mercapto-carboxylic acid which contains 2 to 4 carbon atoms and of a diester of maleic acid with a hydroxyalkylamide of a fatty acid containing 12 to 18 carbon atoms, while excluding oxygen, to a temperature of 50–100° C. until the reaction product, after neutralization with an alkali hydroxide, is soluble in water.

3. A process for the manufacture of a new partial ester of a polybasic sulfide carboxylic acid, which comprises heating substantially molecular proportions of a lower aliphatic mercapto-carboxylic acid which contains 2 to 4 carbon atoms and of a diester of maleic acid with an aliphatic alcohol containing 6–18 carbon atoms, while excluding oxygen, to a temperature of 50–100° C. until the reaction product, after neutralization with an alkali hydroxide, is soluble in water.

4. A process for the manufacture of a new partial ester of a polybasic sulfide carboxylic acid, which comprises heating substantially molecular proportions of thioglycolic acid and of the diester of maleic acid with stearic acid-N-(β-hydroxyethyl)-amide, while excluding oxygen, to a temperature of 50–100° C. until the reaction product, after neutralization with an alkali hydroxide, is soluble in water.

5. A process for the manufacture of a new partial ester of a polybasic sulfide carboxylic acid, which comprises heating substantially molecular proportions of thioglycolic acid and of the diester of maleic acid with oleic acid-N-(β-hydroxyethyl)-amide, while excluding oxygen, to a temperature of 50–100° C. until the reaction product, after neutralization with an alkali hydroxide, is soluble in water.

6. A process for the manufacture of a new partial ester of a polybasic sulfide carboxylic acid, which comprises heating substantially molecular proportions of thioglycolic acid and of maleic acid di-(2-ethyl-hexyl)-ester, while excluding oxygen, to a temperature of 50-100° C. until the reaction product, after neutralization with an alkali hydroxide, is soluble in water.

7. A process for the manufacture of a new partial ester of a polybasic sulfide carboxylic acid, which comprises heating substantially molecular proportions of thioglycolic acid and of a diester of maleic acid with a hydroxy alkylamide of a fatty acid containing 12-18 carbon atoms, while excluding oxygen, to a temperature of 50-100° C. until the reaction product, after neutralization with an alkali hydroxide, is soluble in water.

8. A new partial ester of the formula $$HO-\overset{O}{\underset{\|}{C}}-R_1-S-\underset{\underset{\underset{\|}{O}}{\underset{|}{C}-O-R_3}}{\overset{\overset{\|}{O}}{\overset{|}{C}-O-R_3}}{\overset{|}{C}H}$$

wherein $R_1$ is a lower alkylene radical containing 1-3 carbon atoms and $R_3$ is a member selected from the group consisting of aliphatic hydrocarbon radicals containing 6-18 carbon atoms and radicals of the formula $$-CH_2-CH_2-NH-\overset{O}{\underset{\|}{C}}-R$$

wherein $$R-\overset{O}{\underset{\|}{C}}-$$

is the radical of a fatty acid containing 12-18 carbon atoms.

9. A new partial ester of the formula $$HO-\overset{O}{\underset{\|}{C}}-R_1-S-\underset{\underset{\underset{\|}{O}}{\underset{|}{CH_2-C-O-CH_2-CH_2-NH-\overset{O}{\underset{\|}{C}}-R}}}{\overset{\overset{O}{\|}}{\overset{|}{C}-O-CH_2-CH_2-NH-\overset{O}{\underset{\|}{C}}-R}}{\overset{|}{C}H}$$

wherein $$R-\overset{O}{\underset{\|}{C}}-$$

is the radical of a fatty acid containing 12-18 carbon atoms and $R_1$ is a lower alkylene radical containing 1-3 carbon atoms.

10. A new partial ester of the formula $$HO-\overset{O}{\underset{\|}{C}}-R_1-S-\underset{\underset{\underset{\|}{O}}{\underset{|}{C-O-alkyl}}}{\overset{\overset{O}{\|}}{\overset{|}{C-O-alkyl}}}{\overset{|}{C}H}$$

wherein $R_1$ is a lower alkylene radical containing 1-3 carbon atoms and alkyl is an aliphatic hydrocarbon radical containing 6-18 carbon atoms.

11. The new partial ester of the formula $$HO-\overset{O}{\underset{\|}{C}}-CH_2-S-\underset{\underset{C}{\underset{\|}{CH_3}}}{\overset{}{C}H}\underset{\underset{\underset{O-CH_2-CH_2-NH-\overset{O}{\underset{\|}{C}}-R}{}}{}}{\overset{\overset{\overset{O}{\|}}{\underset{C}{}}}{\overset{}{O-CH_2-CH_2-NH-\overset{O}{\underset{\|}{C}}-R}}}$$

wherein $$R-\overset{O}{\underset{\|}{C}}$$

is the acyl radical of commercial stearic acid.

12. The new partial ester of the formula $$HO-\overset{O}{\underset{\|}{C}}-CH_2-S-\underset{\underset{C}{\underset{\|}{CH_3}}}{\overset{}{C}H}\underset{\underset{\underset{O-CH_2-CH_2-NH-\overset{O}{\underset{\|}{C}}-C_{17}H_{33}}{}}{}}{\overset{\overset{\overset{O}{\|}}{\underset{C}{}}}{\overset{}{O-CH_2-CH_2-NH-\overset{O}{\underset{\|}{C}}-C_{17}H_{33}}}}$$

13. The new partial ester of the formula $$HO-\overset{O}{\underset{\|}{C}}-CH_2-S-\underset{\underset{C}{\underset{\|}{CH_3}}}{\overset{}{C}H}\underset{\underset{\underset{O-CH_2-CH-C_4H_9}{\underset{C_2H_5}{|}}}{}}{\overset{\overset{\overset{O}{\|}}{\underset{C}{}}}{\overset{}{O-CH_2-CH-C_4H_9}}}\underset{C_2H_5}{|}$$

14. A new partial ester of the formula $$HO-\overset{O}{\underset{\|}{C}}-CH_2-S-\underset{\underset{C}{\underset{\|}{CH_3}}}{\overset{}{C}H}\underset{\underset{\underset{O-CH_2-CH_2-NH-\overset{O}{\underset{\|}{C}}-R}{}}{}}{\overset{\overset{\overset{O}{\|}}{\underset{C}{}}}{\overset{}{O-CH_2-CH_2-NH-\overset{O}{\underset{\|}{C}}-R}}}$$

wherein $$R-\overset{O}{\underset{\|}{C}}$$

is the acyl radical of a fatty acid containing 12-18 carbon atoms.

OTTO ALBRECHT.

REFERENCES CITED

The following references are of record in the file of this patent:

Mulvaney: Jour. Am. Chem. Soc., 70, 2428-2429 (1948).

Certificate of Correction

Patent No. 2,576,899  November 27, 1951

OTTO ALBRECHT

It is hereby certified that error appears in the printed specification of the above numbered patent requiring correction as follows:

Between columns 1 and 2, for the inverted line numbers following line "25", for 55, 50, 45, 40, 35, 30, read *30, 35, 40, 45, 50, 55*; column 1, line 40, for "ocetadecyl" read *octadecyl*; column 4, lines 3 to 10, inclusive, for that portion of the formula reading

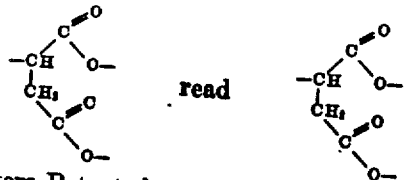

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*